April 1, 1924.

C. A. PARSONS ET AL

DYNAMO ELECTRIC MACHINE

Filed March 26, 1923  2 Sheets-Sheet 1

1,489,002

Inventors
Charles A. Parsons
Jessel Rosen
by Spear, Middleton, Donaldson & Spear
Attys April 1, 1924.  C. A. PARSONS ET AL  1,489,002
DYNAMO ELECTRIC MACHINE
Filed March 26, 1923    2 Sheets-Sheet 2

Patented Apr. 1, 1924.

1,489,002

UNITED STATES PATENT OFFICE.

CHARLES ALGERNON PARSONS AND JESSEL ROSEN, OF NEWCASTLE-ON-TYNE, ENGLAND; SAID ROSEN ASSIGNOR TO SAID PARSONS.

DYNAMO-ELECTRIC MACHINE.

Application filed March 26, 1923. Serial No. 627,852.

*To all whom it may concern:*

Be it known that we, CHARLES ALGERNON PARSONS and JESSEL ROSEN, both subjects of the King of Great Britain and Ireland, and both residing at Heaton Works, Newcastle-on-Tyne, in the county of Northumberland, England, have invented certain new and useful Improvements in and Relating to Dynamo-Electric Machines, of which the following is a specification.

This invention relates to dynamo-electric machines and is particularly applicable to those having rotating fields provided with metal damping bars.

It is found in practice that the eddy currents induced in the rotor can be readily carried by the rotor body and by the keys securing the exciting windings in position, and also that such induced currents can be readily carried by the end caps, which support the ends of the exciting windings where they project beyond the rotor body.

Difficulty is experienced, however, in transmitting these currents across the gap between the cap and the body, and hitherto it has been essential to provide damping bars of large cross section for this purpose, which bars, although serving the purpose intended, are objectionable as they occupy a great deal of space which would be more effectively filled by the exciting windings and thereby appreciably reduce the output.

The gap in question cannot be avoided as it is essential to have a radius or equivalent on the inner face of the cap to enable it to be passed over the coil ends without disturbing the insulation.

In the generator construction in which the keys securing the windings in the slots are cut into short lengths for ease in fitting, it is advisable that the individual lengths should be electrically connected together by other means than the sides of the rotor slots into which they are recessed. The lengths of each complete key are usually bonded together by means of a thin metal strip or liner, called a bonding strip, which is brought into intimate contact with the key lengths by the centrifugal force of the exciting coils. This liner also serves as a mechanical protection to the insulation of the exciting coils when the keys are driven into position.

It is found in practice that although a thin metal strip is sufficient for the above purposes, it is not of sufficient cross-sectional area to enable it to be extended beyond the rotor body to transmit the induced eddy currents across the gap to the end supporting caps.

The object of the present invention is to overcome difficulties of the kind pointed out above.

With such an object, the invention consists in certain details of construction hereinafter described and particularly pointed out in the claims.

Referring to the accompanying drawings:—

Figure 1 shows a part longitudinal section through an alternator rotor,

Figures 2 and 3 showing to an enlarged scale detail longitudinal sections through the rotor body and rotor cap;

In carrying the invention into effect according to one form, the exciting coils, $a$, are arranged on the rotor $b$, in slots, $c$, running parallel to the axis and are held in position by keys in short lengths, $d$, $d'$, arranged end to end and forced into grooves in the rotor body. Where the exciting coils overhang at $e$, as they bend round to a neighbouring slot, they are supported in the well-known manner against centrifugal force by an annular cap, $f$, which butts against or is in close contact with the end lengths, $d'$, of the keys. As explained above, however, for constructional reasons it is necessary or desirable to provide both the cap, $f$, and the lengths of key, $d'$, with an internal radius, $h$, thus leaving a space, and in order to carry the induced currents across this space without local heating, the bonding strip, $i$, above referred to is specially shaped to fill it, thereby locally providing increased contact surface and a large cross-section of high conductivity metal to carry the induced currents between the caps and the rotor body.

Figure 1:
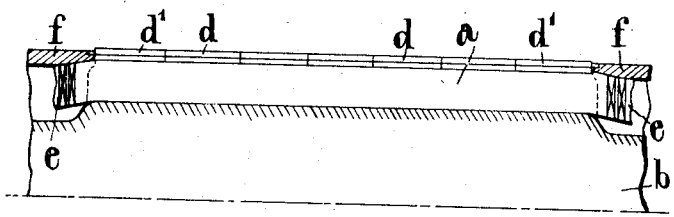
Figure 2:
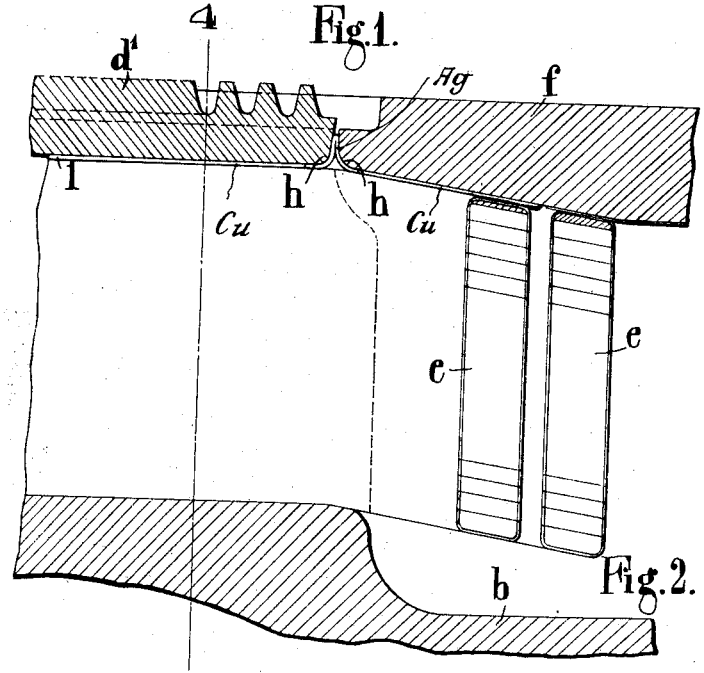

According to one form, (see Figures 2 and 5), a single strip, $i$ is formed with a cuspidal bend or fold, $m$, to fit into the space referred to above, between the cap and the keys. The triangular, or substantially triangular, space within the cusp may be filled by a stemming piece, $n$.

Figure 3:
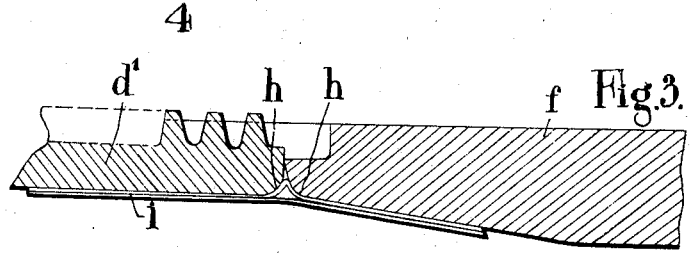
Figure 4:
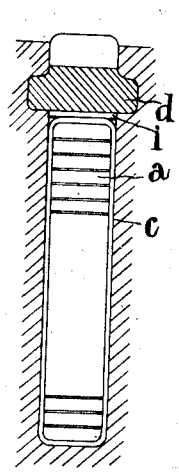
Figure 4 is a cross-section on the line 4—4 of Figure 2 to show a winding slot in the rotor body.
Figure 6:
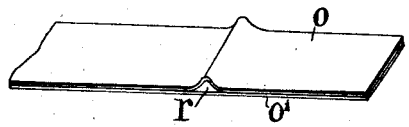
Fig. 6 is a perspective view of the bonding strip illustrated in Fig. 3.

According to another form (see Figures 3 and 6), the bonding strip is compounded of two strips, $o$, $o'$, the former of which is provided with a cuspidal bend or fold as before, the cusped strip, $o$, being arranged in juxtaposition to a flat strip, $o'$, and secured thereto in any convenient manner, the triangular space remaining being similarly filled with a stemming piece, $r$.

Figure 7:
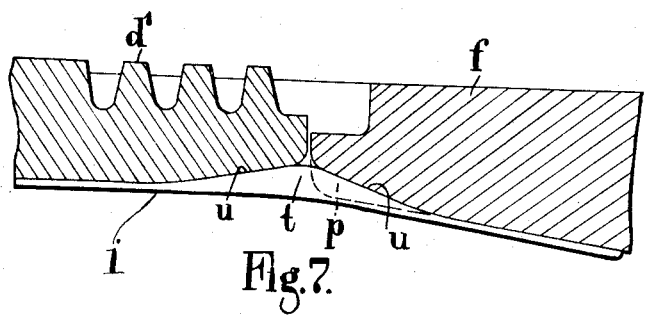
Figure 7 shows a longitudinal section similar to that of Figures 2 and 3 of yet another form of the invention.

According to yet another form (see Figure 7), the bonding strip, $i$, may be solid and provided with a transverse cuspidal ridge or projection, $t$, with a taper, $u$, each side to form a counterpart to the surfaces of the key and the local slots, $p$, of the cap with which it is in contact.

In some cases the transverse ridge may be formed in situ by deforming a plain strip.

Figure 5:
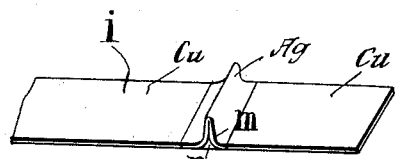
Figure 5 is a perspective view of the bonding strip corresponding to that shown in Fig. 2, showing the cuspidal ridge of one material joined to the remainder of the strip of another material, the material of said ridge having a greater electrical conductivity than the material of the remainder of the strip.

In the example above described, the combined bonding strip and damping bar would usually be of copper, but in order to increase the conductivity in a commercially practicable manner, the main length of the combined strip is made of a metal such as copper having a certain conductivity, while those portions which cross the gaps referred to above are of a metal such as silver having a higher conductivity, the two metals being united by any suitable process such as silver soldering or brazing. Such a form is illustrated in Fig. 5.

By means such as those above described, not only is increased cross-sectional area of bonding strip provided locally to transmit the current between the rotor body and the cap, but there is also increased electrical contact area formed between the keys and the cap.

It will be obvious that the precise shape into which the transverse projection of the bonding strip enters may vary from the double radius or taper described above and the present invention is broad enough in scope to include all forms of bonding strip with transverse projections of a suitable contour to fit into the space in question.

Having now described our invention, what we claim as new and desire to secure by Letters Patent is:—

1. In dynamo-electric machinery, a rotor body with slots; coils in said slots; means for holding said coils in said slots; an end cap in juxtaposition to said holding means with a clearance space of a certain shape therebetween and a series of longitudinal bonding strips electrically connecting said holding means and said end cap, and shaped locally to fill said clearance space, as set forth.

2. In dynamo-electric machinery, a rotor body with slots; coils in said slots; means for holding said coils in said slots, said holding means comprising a series of end-to-end key lengths in each of said slots; an end cap in juxtaposition to said holding means with a clearance space of a certain shape therebetween and a series of longitudinal bonding strips each electrically connecting said key lengths in a slot with said end cap, said strips being shaped locally to fill said clearance space, as set forth.

3. In dynamo-electric machinery, a rotor body with slots, coils in said slots; means for holding said coils in said slots; an end cap in juxtaposition to said holding means with a clearance space of substantially triangular shape therebetween and a series of longitudinal bonding strips electrically connecting said holding means and said end cap, each of said bonding strips being provided with a cuspidal ridge to fill said clearance space, as set forth.

4. In dynamo-electric machinery, a rotor body with slots; coils in said slots; means for holding said coils in said slots, said holding means comprising a series of end-to-end key lengths in each of said slots; an end cap in juxtaposition to said holding means with a clearance space of a certain shape therebetween and a series of longitudinal bonding strips each electrically connecting said key lengths in a slot with said end cap, said strips being shaped locally to fill said clearance space and having successive portions of different electrical conductivities, those portions of higher conductivity being disposed in said clearance spaces, as set forth.

5. As an article of manufacture, a bonding strip having a transverse hollow cuspidal ridge and a filling piece therewithin, as set forth.

6. As an article of manufacture, a bonding strip having a transverse cuspidal ridge, said ridge portion having a higher electrical conductivity than said strip portion, as set forth.

7. As an article of manufacture, a bonding strip having a transverse cuspidal ridge, said ridge portion being of silver and said strip portion of copper, as set forth.

In testimony whereof we have signed our names to this specification.

CHARLES ALGERNON PARSONS.
JESSEL ROSEN.